S. H. JENKINS.
VEHICLE WHEEL.
APPLICATION FILED OCT. 11, 1913.
1,275,435.
Patented Aug. 13, 1918.
2 SHEETS—SHEET 1.
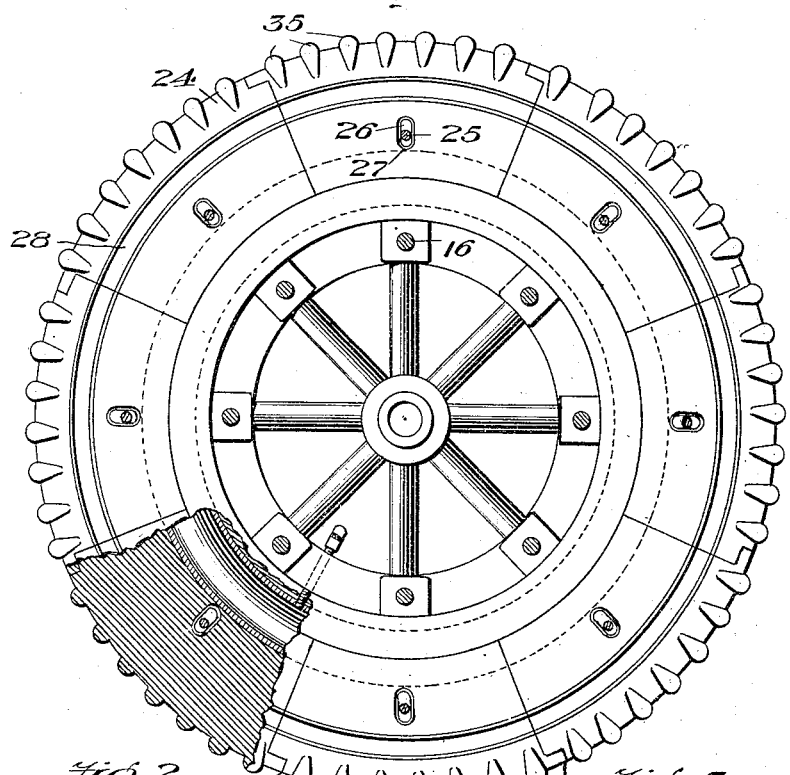
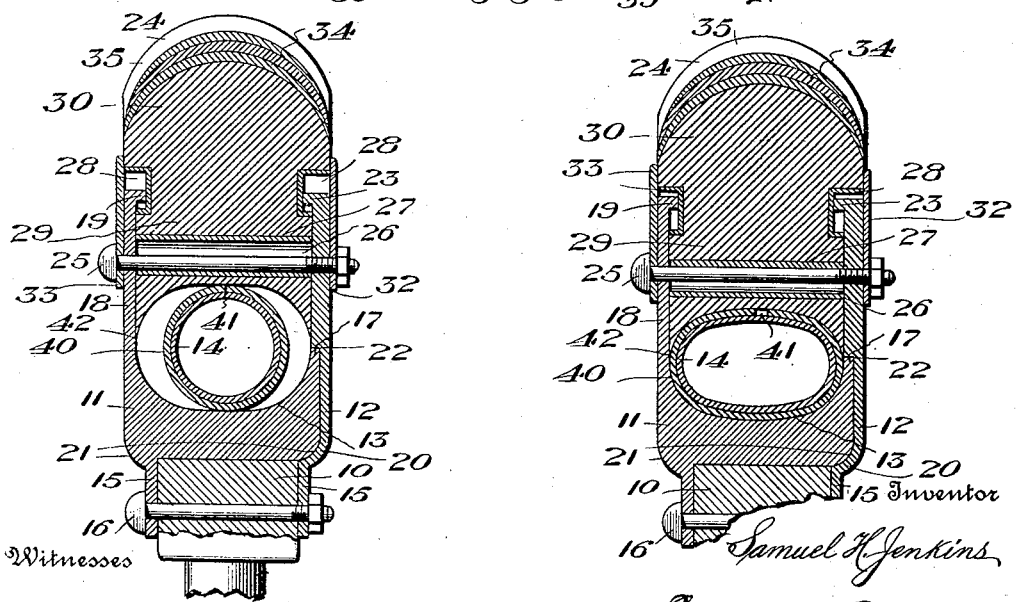

S. H. JENKINS.
VEHICLE WHEEL.
APPLICATION FILED OCT. 11, 1913.
1,275,435.
Patented Aug. 13, 1918.
2 SHEETS—SHEET 2.
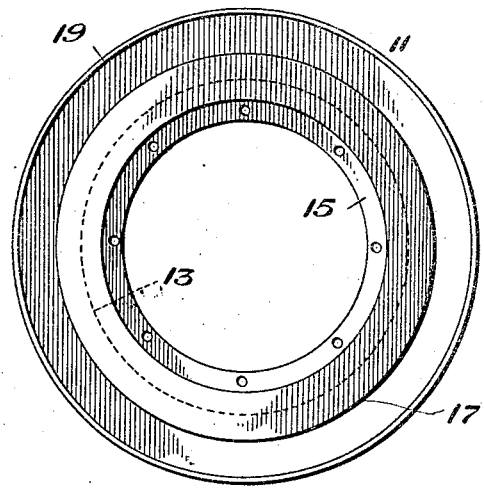
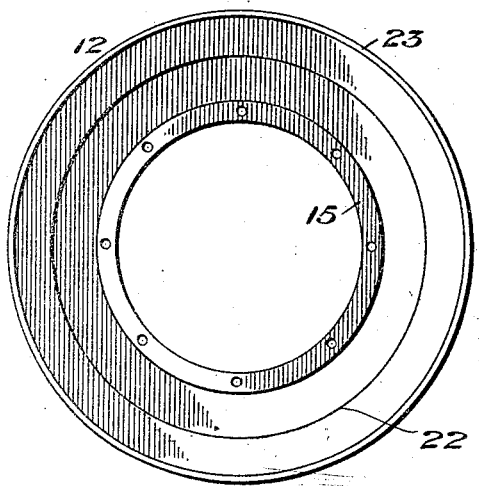
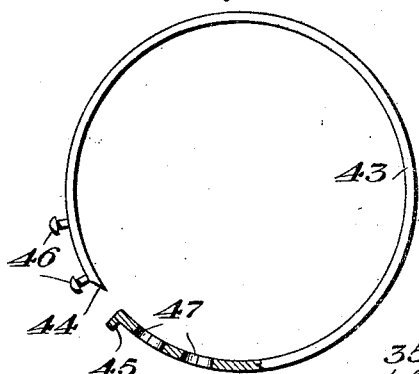
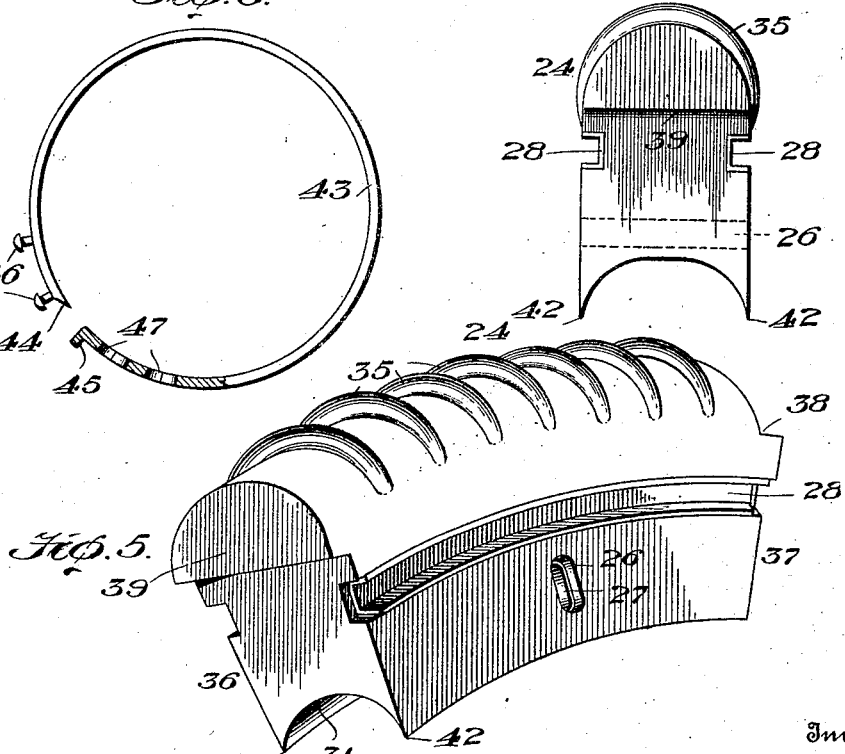
Witnesses
Inventor
Samuel H. Jenkins
By Edoon Bro's,
Attorneys

UNITED STATES PATENT OFFICE.

SAMUEL H. JENKINS, OF CHATTANOOGA, TENNESSEE, ASSIGNOR OF ONE-FOURTH TO LOVRICK P. BARNES, OF CHATTANOOGA, TENNESSEE.

VEHICLE-WHEEL.

1,275,435.   Specification of Letters Patent.   Patented Aug. 13, 1918.

Application filed October 11, 1913. Serial No. 794,654.

*To all whom it may concern:*

Be it known that I, SAMUEL H. JENKINS, a citizen of the United States, residing at Chattanooga, in the county of Hamilton and State of Tennessee, have invented certain new and useful Improvements in Vehicle-Wheels; and I do hereby declare the following to be a full, clear, and exact description of the invention, such as will enable others skilled in the art to which it appertains to make and use the same.

This invention is a wheel for vehicles in which the tread element of the tire is supported by a pneumatic cushion.

A purpose of the invention is to provide an improved construction of wheel of this character in which the pneumatic cushion, or air tube, shall be fully protected from puncture.

A further purpose of the invention resides in the provision of a movable tire tread element whereby upon the deflation of the pneumatic cushion from any cause, the tread element of the tire will be self-cushioning, thereby unimpairing the service of the wheel except for the reduced cushion effect resulting from the deflation of the pneumatic element.

Furthermore, the invention contemplates the provision of a series of removable tread members composing the tread element, so mounted upon a wheel, that they distribute the stress of compression circumferentially upon the pneumatic cushion, and in the event of the deflation of the pneumatic cushion will coöperate to retain the tire element of the wheel against collapse and render the wheel unimpaired except for the loss of the pneumatic cushion. These removable tread members are adapted to withstand lateral strain as well as the end to end strain, and provision is made whereby the interior portion of the outer cushions of the wheels and the pneumatic cushion are protected against injury by foreign matter.

In the protection of the pneumatic cushion or air tube, there is provided a series of solid cushion tread members for the tire, and metallic guards provide a housing for the pneumatic tube or cushion, the tread members and metallic guards completely protecting the pneumatic cushion against injury by objects usually encountered by vehicle wheels.

A further purpose of the invention is to produce an improved construction of vehicle wheel, adapted especially for motor vehicles, which embraces simplicity and economy of construction, as well as durability and safety in operation; providing the parts of all the wheels with similar structure, to permit of interchangeability of the parts, and also facilitate the quick repair in the event of accident, the series of removable tread members being so positioned on the parts of the wheel that they coöperate to relieve the cushion element or air tube from undue strain.

With these ends in view, the invention comprises a wheel having a felly, a plurality of plates adapted to be secured thereto, one of said plates being provided with a channel for receiving a pneumatic cushion, a series of wedging tread blocks movably mounted between the plates and adapted to rest upon the pneumatic cushion, means whereby the plates permit the radial movement of the block in outward and inward direction, means to limit the lateral movement of the block, and means whereby foreign substances are prevented from entering through apertures adjacent the blocks and gaining access to the pneumatic cushion, or other parts of the device liable to be injured thereby, the series of blocks coöperating to sustain the tread element of the wheel in its normal position should the pneumatic cushion become deflated thereby permitting the continued travel of the vehicle without serious injury to the tire, due to the engagement of the tire with the tire rim or filling. The invention also embodies the combined effect of a pneumatic tire, and a solid rubber or cushion tire, the two parts being so constructed that the pneumatic element thereof is protected against injury from foreign substances, as well as from undue strain which may be imposed upon the wheel.

The invention consists also in the combination, construction and arrangement of parts as will be hereinafter more fully described, and particularly pointed out in the appended claims.

One embodiment of the invention is illustrated in the accompanying drawings, but it is to be understood that the construction shown therein is for the purpose of illustration, only, and not as defining the limits of the invention.

In the drawings—

Figure 1 is a front elevation of a wheel, parts being in section, illustrating the improvements.

Fig. 2 is a vertical sectional view through a tire and rim showing the cushion element fully extended.

Fig. 3 is a sectional view similar to Fig. 2, but showing the cushion element and the tread element, in the positions they would assume when the wheel is under compression by a load.

Fig. 4 is an end view of one of the tread blocks.

Fig. 5 is a perspective view of one of the tread blocks.

Fig. 6 is a front elevation of the channeled retaining plate.

Fig. 7 is a front elevation of a retaining plate which coöperates with the channeled plate of Fig. 6 to form a housing for the cushion element as well as means for retaining the tread elements in their operative positions on the rim felly.

Fig. 8 is a side elevation of a device which may be used to lock the tread elements in their adjusted positions to quickly assemble the parts of a wheel, said device being adapted to be placed on the outer or tread surface of the block.

The construction of the hub, spokes and felly of the wheel may be of any suitable or preferred type and of any desired material.

The felly 10 may be clamped between two annular tire retaining plates 11, 12, the plate 11 being shown in Figs. 2 and 3 as substantially L-shaped in cross section and provided with a rounded channel portion 13 for the reception of the pneumatic cushion element or tire 14. This channel portion 13 is preferably semi-oval in cross section as shown. Each of these plates 11, 12, is provided with a depending flange 15, for lodgment upon and engagement with the felly 10, whereby the felly may be clamped between said flanges 15 by means of bolts 16, or any other suitable securing means, passing through both of said flanges and the felly, the bolts 16 being sufficiently frequent in the circumference of the wheel to insure rigidity of the various parts thereof.

The plate 11 besides being provided with a depending flange 15, and the channel 13, is extended around one edge to form an annular shoulder 17, while around the opposite edge, or other face of the wheel, this member or plate 11 is extended to form an annular arm 18 provided with an inwardly extending flange 19 at the upper end thereof.

The plate 12 is preferably of a thin sheet of metal and provided with a lower curved shoulder 20 adapted to fit securely against a rounded portion 21 of the plate 11, and provided also with an abutting shoulder 22 to engage the shoulder 17 of plate 11. This plate 12 is provided also with an inwardly extended circumferential flange 23, which is adapted to be positioned substantially opposite to the flange 19 of the plate 11, the two plates 11 and 12 when bolted to the felly as described, providing a substantially U-shaped channel in cross section, throughout the circumference of the wheel.

As previously stated, the pneumatic element or air tube, 14, is adapted to be positioned within the channel portion 13 of the member 11, and so mounted therein, as to be free from contact with the sides of said channeled portion, substantially as illustrated in Fig. 2.

Within this circumferential U-shaped channel formed by the members or plates 11, 12, there is adapted to be positioned, in addition to the pneumatic cushion element or air tube 14, a series of tread blocks, 24, forming the tread surface of the tire proper. These tread blocks 24 are adapted to be positioned in substantial end to end engagement with each other around the circumference of a wheel, as shown in Fig. 1, and to be clamped between the opposed inner surfaces of the annular plates 11, 12, by any suitable means, such as the bolt 25 passing through said plates and the intervening blocks, said bolts being sufficiently frequent in the circumference of the wheel as to retain the blocks in their operative position. It is preferred to employ one of said bolts 25 for each of the blocks. These bolts 25 are adapted to pass through a transverse aperture 26 in the tire blocks, said aperture 26 being illustrated in vertical section as an elongated slot, which is suitably reinforced by a metallic thimble 27, preferably of a length slightly less than the width of the tire block at the aperture 26 to permit of clamping and compression of the blocks when retained in place. This thimble may be made of any suitable material and is preferably vulcanized into the material of the tire block 24 to retain it in position. The thimble 27 is adapted to engage the bolt 25, and relieve the tire element or block 24 from strain and wear which would otherwise be imposed thereon by reason of the engagement of the material of the block with the bolt 25 when the tread member is moved to its compressed position shown in Fig. 3.

Each of the tread blocks are preferably provided also with wear plates 28, shown in the drawings as substantially U-shaped, in cross section, tread plate 28 being preferably a little shorter in length than the length of the block 24. One of said channeled plates 28 is preferably employed on each side of the block, as shown in Figs. 2 and 3, and if desired, these channel plates may be vulcanized into the material of the blocks. These plates 28 are adapted to be engaged by the inturned flanges 19 and 23 of the annular plates 11, 12, respectively, to limit the movement of the tread blocks in both an inward and outward radial direction, the plates 28 taking up the wear and tear on the parts which would otherwise be imposed upon the material of the check block 24 by the flanges 19 and 23. These channeled wear plates 28 are preferably made of less length than the tread blocks 24 to permit of the circumferential compression of the series of blocks when under the strain which is liable to be imposed upon them should great stress be exerted upon the wheel, or should the cushion element become damaged.

The lower section 29 of each of the tread blocks 24 is preferably of less width than the upper section or tread section 30 thereof. It is preferred also to channel out this lower section as at 31, the series of tread elements forming a circumferential channel throughout the circumference of the wheel when assembled to accommodate the upper portion of the pneumatic element 14, the channel 31 of the tread element, and the channel 13 of the larger plate 11, coöperating to produce a substantially oval chamber throughout the interior of the wheel for the reception of the air tube.

There may be employed on each face of the wheel, resilient annular plates 32, 33, which plates may be bolted to the wheel structure by means of the bolts 25, these plates 32, 33, operating to cover a portion of the side faces of the tread block 24, and especially that portion of the block which is provided with the channeled retaining plate 28. These guard plates 32, 33, operate to prevent the ingress of foreign substances, such as sand, grit and moisture, between the plates 11, 12, and the tread element and cushion element of the tire. These resilient guard plates 32, 33, serve also to limit the lateral movement of the tread block 24 with reference to the wheel, thereby preventing the block from being torn from the wheel structure when placed under stress as when rounding a sharp curve at high speed.

The tread surface of each of the blocks 24 is preferably provided with one or more layers of fabric, such as ducking, indicated at 34, and the tread surface thereof may be provided also with any suitable non-skidding devices indicated at 35.

Each of the tread sections 24 is preferably arcuate in form, as shown in Fig. 5, and when assembled upon a wheel, the ends 36, 37, taper from the outer or tread surface toward the inner or channeled surface thereof, thereby forming a wedge-shaped tread block. Each of the blocks may be of the same size and shape and form to permit of interchangeability of the parts. Each of the tread blocks 24 is shown provided with a cut out portion 38 and an over-hanging portion 39. The over-hanging portion 39 may be of any desired form and is illustrated in Figs. 1 and 5. These over-hanging flanges serve to prevent dirt, grit or other foreign matter from working between the tire blocks and the wheel passing over the ground.

If desired, the pneumatic cushion element 14, may be covered by any suitable material, such as ducking indicated at 40, shown in the form of a tube or hose, to protect the cushion element from coming in direct contact with the metal housing. This cover is split at 41 to permit of the ready expansion of the cushion or air tube 14 when the wheel is under compression.

It will be observed that by the employment of a series of radially movable tread blocks, that greater traction will be gained in the wheel, that all the advantages of the pneumatic cushion will be available with the wheel, as well as the advantages of the solid cushion tire.

The lower portion of each of the tread blocks is preferably drawn down to a thin peripheral edge 42 which is adapted to slide along the smooth inner curved surface of the metallic channel 13 thereby preventing a cutting or binding of the parts with the metal structure, as well as eliminating all the liability of injury to the air cushion.

Suitable means may be employed for inflating the air cushion. Should the air tube become injured in any manner, and permit of the loss of the air cushion, it will be observed that the wedge-shaped tread blocks 24 will coöperate to distribute the stress circumferentially around the wheel, and that said blocks will be maintained in their normal position by means of the bolts 25, the plates 11, 12, the guard plates 32, 33, without injuring the wheel should the vehicle be continued on its journey without the use of a pneumatic cushion or tire 14. Moreover, this circumferential distribution of the strain by the series of tread blocks, relieves the strain upon the air cushion or tube, thereby reducing the liability of bursting the tube when placed under heavy strain or sudden compression, through contact with obstructions on the road surface.

Assuming that a repair is necessary to some part of the wheel, for instance the air cushion element 14, the bolts 16 and 25 can be readily removed, permitting the removal of the smaller rim plate 12, whereupon the tread blocks 24 may be lifted out of position to expose the air tube 14. After such repairs shall have been made, the tread blocks 24 may be laid end to end in their normal position, and may be bound in this position by a suitable block retaining clamp 43 shown in Fig. 8. This clamp may be made of steel ribbon, one end of which being tapered as at 44, while the other end may be provided with a rounded or hooked portion 45. The ribbon 43 may be provided with any suitable means for retaining the ends together to lock the tread blocks in their circumferential formation. One form of such means is shown as the studs 46 adapted to pass through apertures 47 in the ribbon, although any other suitable means may be employed. After this ribbon shall have been secured to the tread blocks, the tread element may be lifted as a unit and placed in position on the rim plate 11, with the retaining U-shaped plate 28 engaging the flange 19 of the plate 11, whereupon plate 12 may be placed in position to have its flange 23 engage the other U-shaped retaining plate 28, and the bolts 16 and 25 may pass to their previous position, whereupon the wheel will be ready for use.

It is obvious that various changes and modifications may be made in the structure as disclosed herein, but the right to make such changes and alteration therein, as fairly fall within the scope of the appended claims, is reserved.

Having thus described my invention, what I claim as new, and desire to secure by Letters Patent, is:—

1. A wheel provided with a plurality of coöperating rim plates adapted to be rigidly secured to the felly of a wheel, each of said rim plates being provided with inturned retaining flanges at the upper edges thereof, a plurality of wedge-shaped tread blocks positioned between said rim plates and adapted to move radially on the wheel, each of said blocks being provided on each side thereof with channeled retaining plates substantially U-shaped in cross section, one arm of which is shorter than the other to abut against the side of the respective rim plates when the retaining flanges engage the channeled retaining plates, resilient guard plates adapted to be positioned against the rim plates to cover the U-shaped channeled retaining plates, and means passing through the tread blocks, the rim-plates and the guard plates to retain the parts in operative position.

2. A wheel provided with a plurality of coöperating rim-plates adapted to be secured to the felly thereof, a plurality of wedge-shaped blocks positioned between said rim-plates and adapted for radial movement on the wheel, each of said blocks being provided with a channeled retaining plate on each side thereof, retaining flanges carried by each of said rim-plates and adapted to engage said channeled plates of the said blocks to permit of limited radial and transverse movements of said blocks, circumferential resilient guard plates secured to and extending beyond the peripheral edge of said rim-plates and adapted to limit the transverse movement of said tread blocks at a point beyond the channeled retaining plates, said guard plates housing the channeled retaining plates during radial movements, and means to retain the resilient guard plates and tread blocks in position on the rim-plates.

3. A wheel provided with a plurality of coöperating rim plates adapted to be secured to the felly thereof, a plurality of tread blocks secured for radial movement between said rim plates, a flange on each rim plate to limit the radial movement of said tread blocks, and a circumferential guide plate overlapping each rim plate and operating to limit the transverse movement of the tread blocks, said guide plates being secured to said rim plate by bolts which pass through said tread blocks.

4. A wheel provided with a plurality of coöperating rim plates adapted to be rigidly secured to the felly of a wheel, the rim plates being severally provided at their outer circumferential edges with inturned retaining flanges, a plurality of tread elements positioned for restricted movements between said rim plates and provided with elongated transverse slots, said tread elements being provided with a substantially U-shaped channel member for coöperation with the inturned flanges of said rim plates serving as guide members and also to restrict the radial movement of the tread elements, bolts passing through the slots of the tread elements to retain them in their operative position and permit of limited radial movement, and guard plates coöperating with said rim plates and tread elements to prevent transverse displacement of the tread elements during their radial movements.

5. A wheel provided with a plurality of coöperating rim plates adapted to be rigidly secured to the felly of a wheel, each of the rim plates having a retaining flange at the outer edges thereof, a pneumatic element, a tread surface composed of a plurality of wedge shaped tread blocks positioned between said rim plates and adapted to move radially on the wheel, said blocks being composed of resilient material adapted to have their ends abut to permit of circumferential distribution of the strain among the several blocks, each of said blocks being channeled on their sides and provided with an embedded metallic member, which is substantially U-shaped in cross section to receive said retaining flanges, and the outer edges of which U-shaped members terminate short of coming flush with the sides of said blocks to allow for compression, exterior resilient circumferential rim plates mounted to overlap the channel in said blocks, a plurality of bolts passing through the plurality of rim plates, and a tube oval in cross-section and of less width than the blocks provided in each of said tread blocks to allow for compression and to receive said bolts and also to make a close and watertight fit, said channeled metallic members and bolts coöperating with the rim plates to limit the radial movement of said tread blocks in their inward and outward directions, and to also limit the radial movement of the tread blocks.

In testimony whereof, I affix my signature, in presence of two witnesses.

SAMUEL H. JENKINS.

Witnesses:
DANIEL R. FORBES,
J. F. H. MOTHERSHEAD.